(12) United States Patent
Chen et al.

(10) Patent No.: US 12,379,644 B2
(45) Date of Patent: Aug. 5, 2025

(54) LENS MODULE

(71) Applicant: TDK TAIWAN CORP., Taoyuan (TW)

(72) Inventors: Shu-Shan Chen, Taoyuan (TW); Chao-Chang Hu, Taoyuan (TW)

(73) Assignee: TDK TAIWAN CORP., Taoyuan City (TW)

( * ) Notice: Subject to any disclaimer, the term of this patent is extended or adjusted under 35 U.S.C. 154(b) by 550 days.

(21) Appl. No.: 17/860,563

(22) Filed: Jul. 8, 2022

(65) Prior Publication Data
US 2024/0012310 A1 Jan. 11, 2024

(51) Int. Cl.
*G03B 5/00* (2021.01)
*G02B 7/02* (2021.01)
*H02N 2/06* (2006.01)

(52) U.S. Cl.
CPC .............. *G03B 5/00* (2013.01); *G02B 7/023* (2013.01); *H02N 2/06* (2013.01); *G03B 2205/0061* (2013.01)

(58) Field of Classification Search
CPC . G03B 5/00; G02B 7/023; H02N 2/06; H02N 2/101
See application file for complete search history.

(56) References Cited

U.S. PATENT DOCUMENTS

2022/0326471 A1* 10/2022 Onodera .................. G02B 7/08

FOREIGN PATENT DOCUMENTS

CN 214174723 U 9/2021

* cited by examiner

*Primary Examiner* — James A Dudek
(74) *Attorney, Agent, or Firm* — MUNCY, GEISSLER, OLDS & LOWE, P.C.

(57) ABSTRACT

A lens module is provided. The lens module includes a first optical element, a first moveable unit, a base and a first driving module. The first optical element is disposed on the first moveable unit. The first driving module is disposed on the base. The first driving module is connected to the first moveable unit. The first driving module is adapted to move the first moveable unit relative to the base.

18 Claims, 8 Drawing Sheets

LENS MODULE

BACKGROUND OF THE INVENTION

Field of the Invention

The present invention relates to a lens module, and in particular to a lens module with moveable optical elements.

Description of the Related Art

With the increasingly powerful functionality of smartphones, users have gradually come to rely primarily on their smartphones for taking photographs. Lens modules with a long focal length (75 mm to 200 mm or more) have been used in smartphones. The lens module of a conventional telephoto segment has optical components and driving modules (such as a driving motor), which are relatively bulky and cannot be integrated into the smartphone very easily. In addition, the structure of a conventional telephoto lens module is too complicated, and it can easily be damaged by external vibration, which makes it difficult to pass the anti-drop test.

BRIEF SUMMARY OF THE INVENTION

Embodiments of the invention are provided to address the aforementioned difficulty.

In one embodiment, a lens module is provided. The lens module includes a first optical element, a first moveable unit, a base and a first driving module. The first optical element is disposed on the first moveable unit. The first driving module is disposed on the base, wherein the first driving module is connected to the first moveable unit, and is adapted to move the first moveable unit relative to the base.

In one embodiment, the lens module further comprises a second optical element, a second moveable unit, and a second driving module. The second optical element is corresponding to the first optical element. The second optical element is disposed on the second moveable unit. The second driving module is disposed on the base, wherein the second driving module is connected to the second moveable unit, and is adapted to move the second moveable unit relative to the base.

In one embodiment, the first driving module comprises a first piezo actuator and a first driving rod, the first moveable unit is slidably connected to the first driving rod, and the first piezo actuator is adapted to drive the first driving rod to move the first moveable unit relative to the first driving rod in a first direction.

In one embodiment, the second driving module comprises a second piezo actuator and a second driving rod, the second moveable unit is slidably connected to the second driving rod, and the second piezo actuator is adapted to drive the second driving rod to move the second moveable unit relative to the second driving rod in a second direction, and the first direction is opposite the second direction.

In one embodiment, the first moveable unit comprises a first moveable platform and a first sheath member, the first sheath member is connected to the first moveable platform, the first optical element is disposed on the first moveable platform, and the first sheath member is telescoped on the first driving rod.

In one embodiment, the first sheath member comprises an elastic sheath and a plurality of holding elements, the holding elements are sandwiched between the first driving rod and the elastic sheath, and each holding element linearly contacts the first driving rod.

In one embodiment, the first moveable platform comprises a first holding portion and a second holding portion, and the first sheath member is held between the first holding portion and the second holding portion.

In one embodiment, the first driving module further comprises a first buffer member, the first buffer member is telescoped on one end of the first driving rod, and the first buffer member is affixed to the base.

In one embodiment, the base comprises a hole and the first buffer member is affixed in the hole.

In one embodiment, the first buffer member is affixed in the hole with glue.

In one embodiment, the first driving module further comprises a second buffer member, the second buffer member is telescoped on the first driving rod, the second buffer member abuts the base, and the first sheath member is located between the first buffer member and the second buffer member.

In one embodiment, the first piezo actuator abuts the base.

In one embodiment, the first driving module further comprises a counterweight block, the counterweight block is affixed to the base, and the first piezo actuator is connected to the counterweight block.

In one embodiment, the base comprises a first wall and a second wall, the counterweight block is sandwiched between the first wall and the second wall.

In one embodiment, the lens module further comprises a first guiding rod and the second guiding rod, two ends of the first guiding rod are affixed to the base, two ends of the second guiding rod are affixed to the base, the first moveable unit is slidably connected to the first guiding rod and the second guiding rod, the second moveable unit is slidably connected to the first guiding rod and the second guiding rod, and the first moveable unit and the second moveable unit are slidable along the first guiding rod and the second guiding rod.

In one embodiment, the lens module further comprises a magnetic restriction element, wherein the magnetic restriction element is disposed on the base, the first moveable unit comprises a unit magnetic element, the unit magnetic element is disposed on the first moveable platform, and magnetic attraction is formed between the magnetic restriction element and the unit magnetic element.

In one embodiment, the lens module further comprises a circuit board, wherein the circuit board comprises a sensor, the first moveable unit further comprises an induction magnet, the induction magnet is disposed on the first moveable platform, and the sensor is corresponding to the induction magnet.

In one embodiment, the unit magnetic element and the magnetic restriction element correspond to the second guiding rod, and the sensor and the induction magnet correspond to the first guiding rod.

In one embodiment, the first moveable platform comprises a supporting sheet, and the supporting sheet is located between the first optical element and the circuit board.

In one embodiment, the first guiding rod and the second guiding rod are located between the first driving rod and the second driving rod.

In the lens module of the embodiment of the invention, the optical elements are moved by the piezo actuators. The lens module thus can be easily integrated into the smartphone. The first buffer member and the second buffer member are utilized in the lens module to provide buffer effect to prevent the lens module from being damaged in unexpected strike, and the reliability of the lens module is improved. Additionally, the unit magnetic element and the magnetic restriction element are utilized, and the first moveable unit can sufficiently contact the first guiding rod and the second guiding rod. The first moveable unit is prevented from misalignment and excessive vibration.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
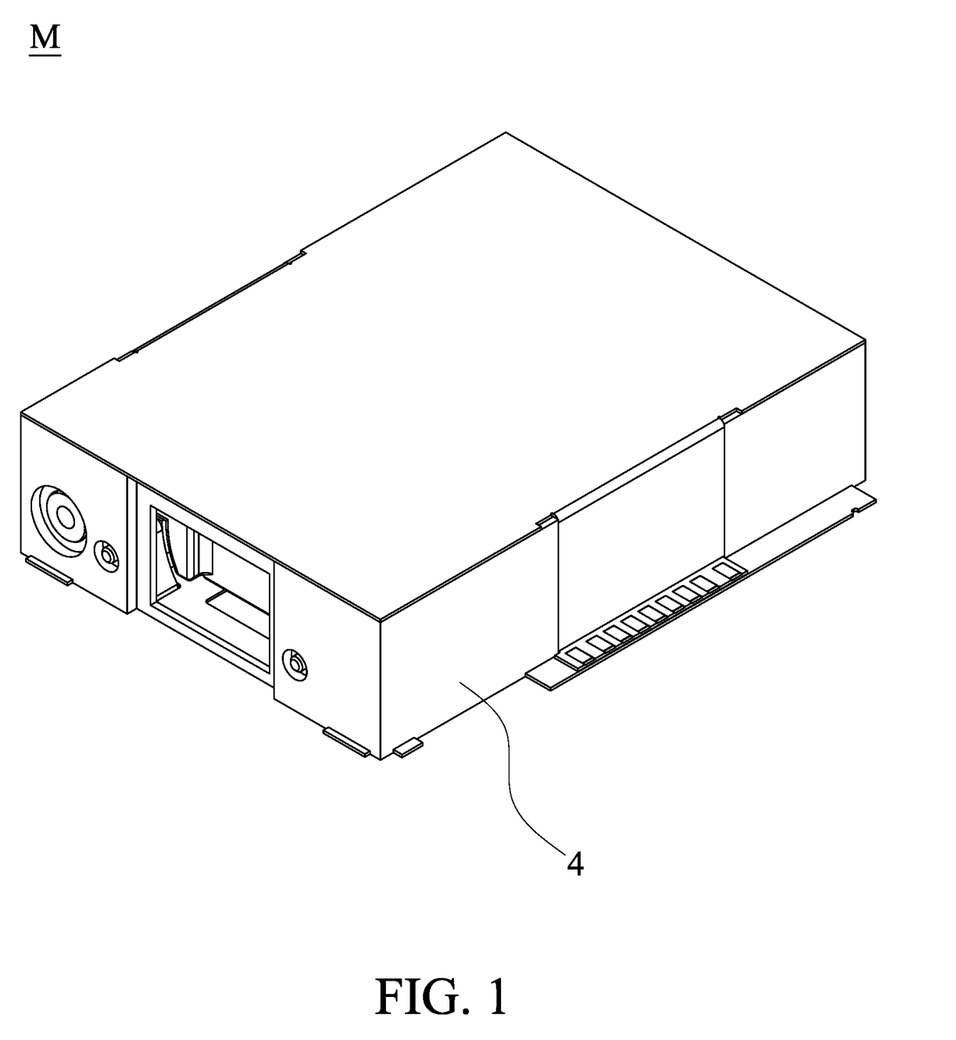
FIG. 1 is a perspective view of the lens module of the embodiment of the invention.
Figure 2:
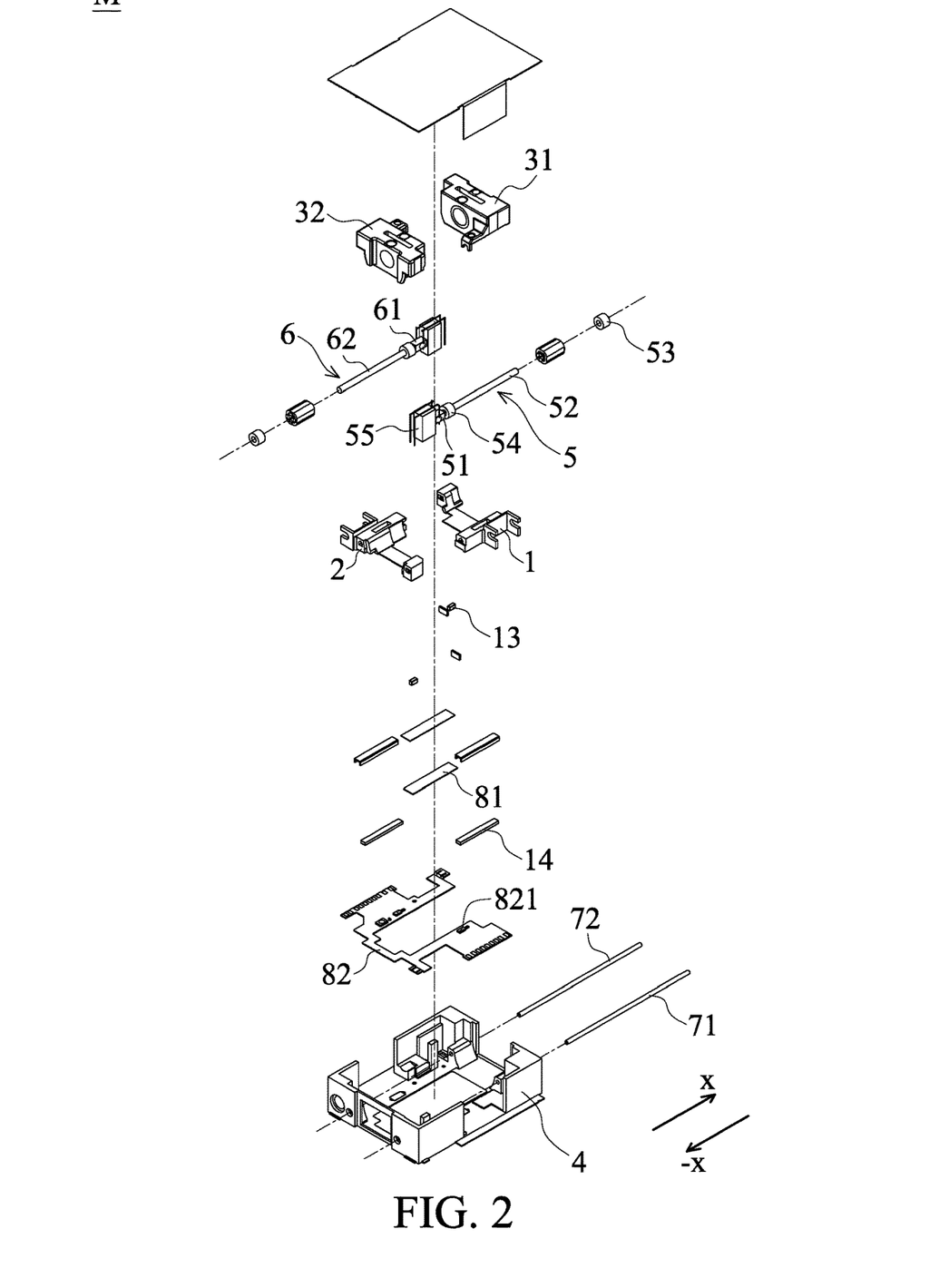
FIG. 2 is an exploded view of the lens module of the embodiment of the invention.

FIG. 1 is a perspective view of the lens module of the embodiment of the invention. FIG. 2 is an exploded view of the lens module of the embodiment of the invention. With reference to FIGS. 1 and 2, the he lens module M of the embodiment of the invention includes a first optical element 31, a first moveable unit 1, a base 4 and a first driving module 5. The first optical element 31 is disposed on the first moveable unit 1. The first driving module 5 is disposed on the base 4. The first driving module 5 is connected to the first moveable unit 1, and is adapted to move the first moveable unit 1 relative to the base 4.

With reference to FIGS. 1 and 2, in one embodiment, the lens module M further comprises a second optical element 32, a second moveable unit 2, and a second driving module 6. The second optical element 32 is corresponding to the first optical element 31. The second optical element 32 is disposed on the second moveable unit 2. The second driving module 6 is disposed on the base 4. The second driving module 6 is connected to the second moveable unit 2, and is adapted to move the second moveable unit 2 relative to the base 4. In this embodiment, the base 4 is a housing. The housing covers the first optical element 31, the second optical element 32, the first moveable unit 1, the second moveable unit 2, the first driving module 5 and the second driving module 6.

Figure 3A:
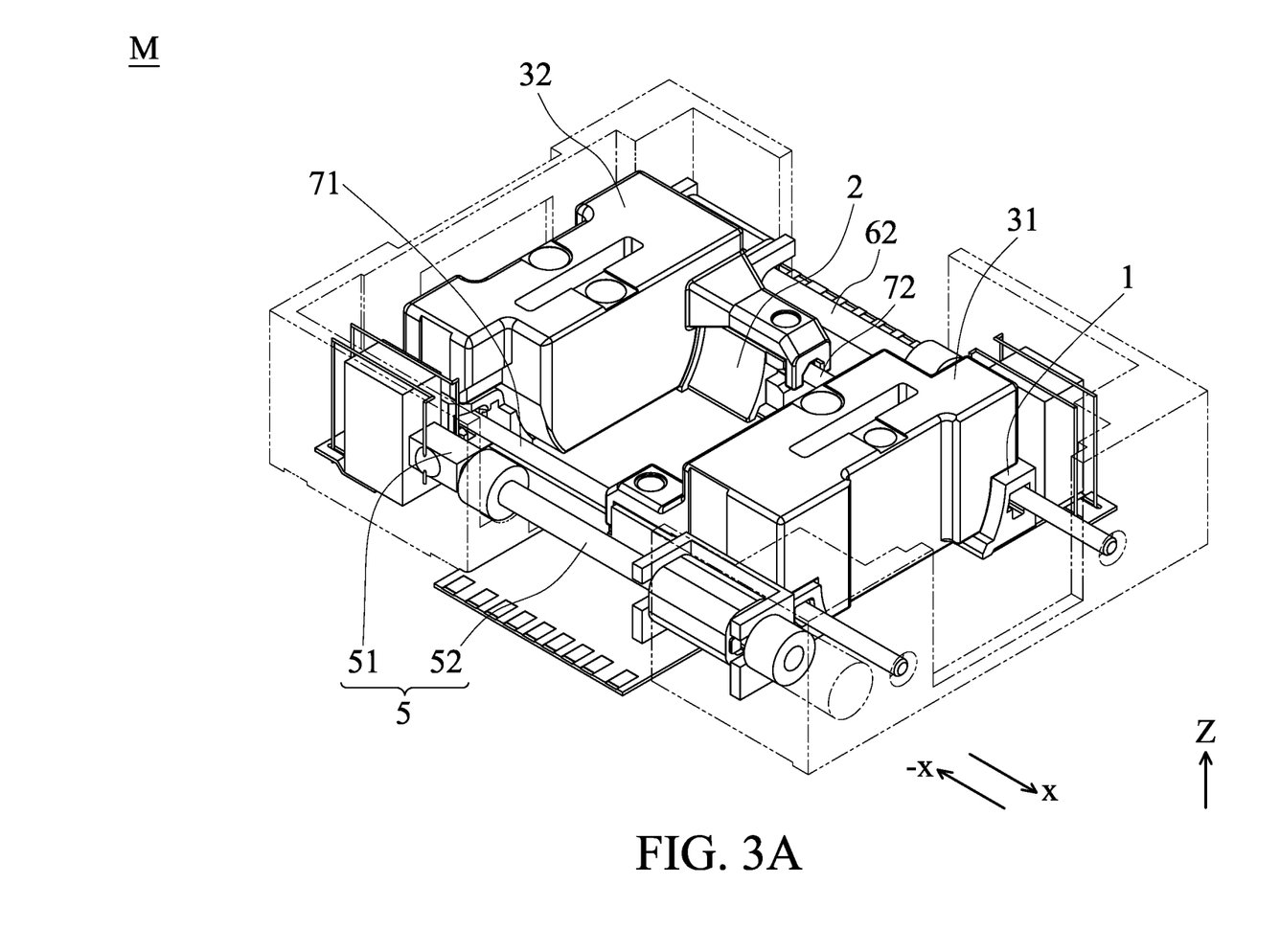
FIG. 3A shows the inner structure of the lens module of the embodiment of the invention.
Figure 3B:
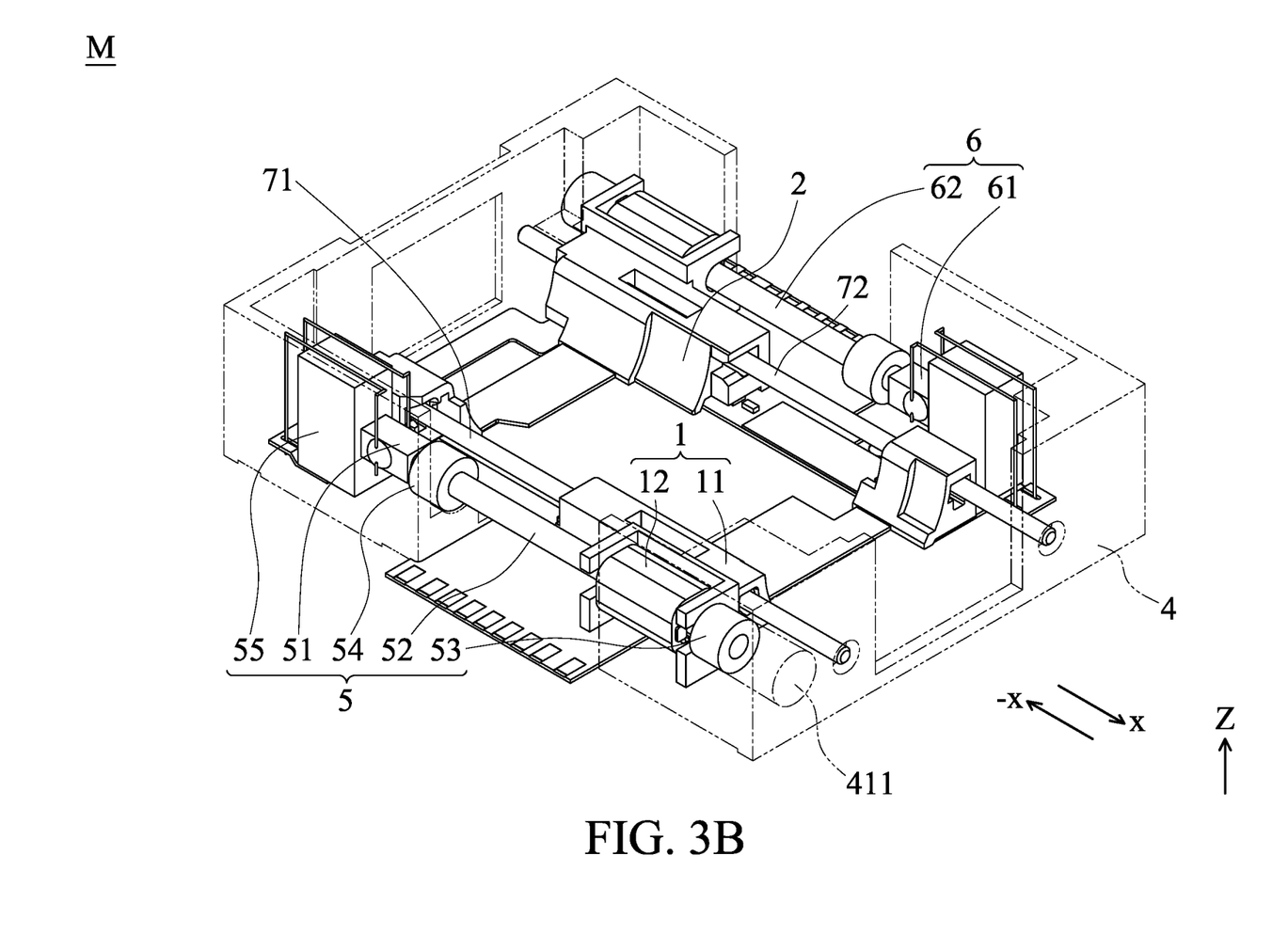
FIG. 3B shows the inner structure of the lens module of the embodiment of the invention, wherein the first optical element and the second optical element are omitted.
Figure 4:
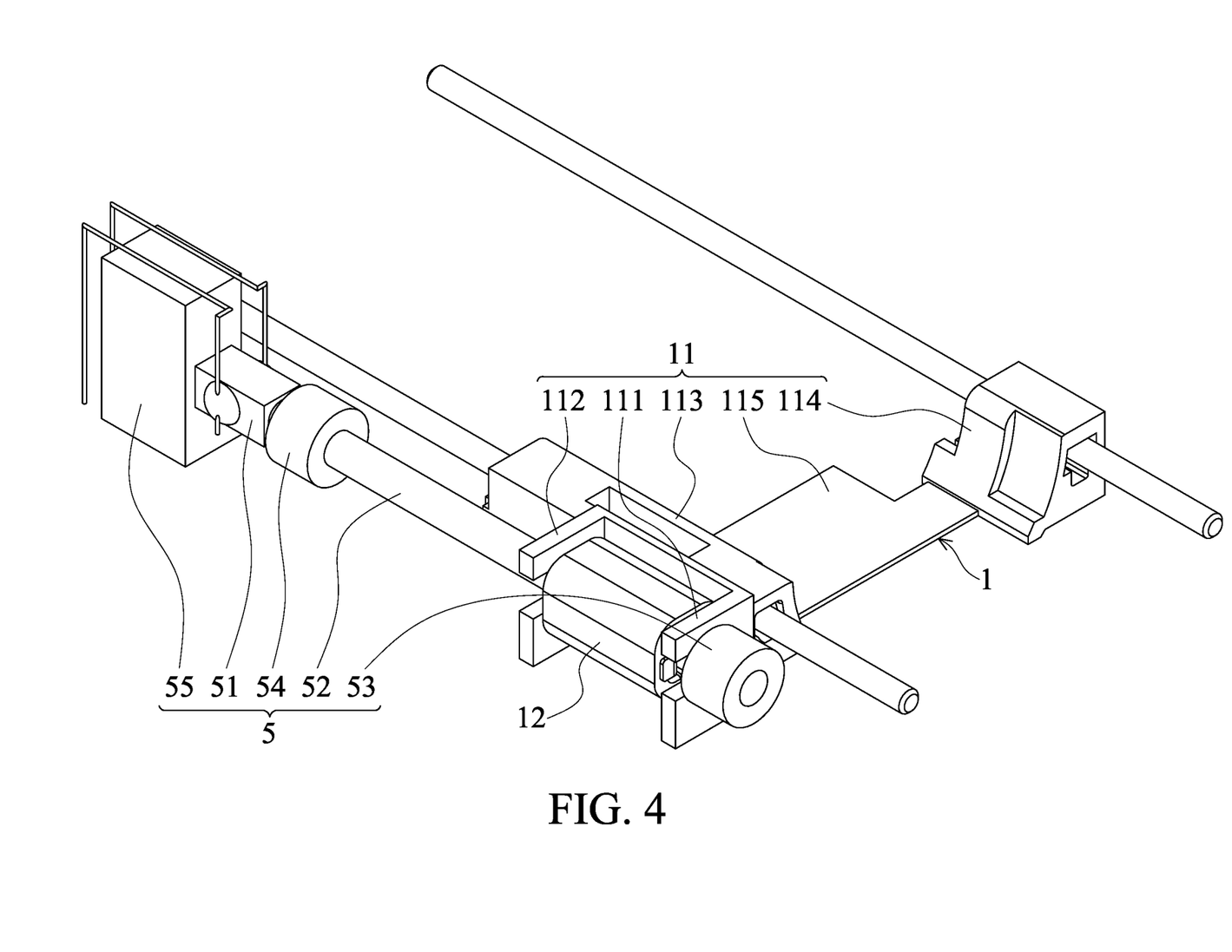
FIG. 4 shows the details of the first driving module and the first moveable unit of the embodiment of the invention.

FIG. 3A shows the inner structure of the lens module of the embodiment of the invention. FIG. 3B shows the inner structure of the lens module of the embodiment of the invention, wherein the first optical element and the second optical element are omitted. FIG. 4 shows the details of the first driving module and the first moveable unit of the embodiment of the invention. With reference to FIGS. 2, 3A, 3B and 4, in one embodiment, the first driving module 5 comprises a first piezo actuator 51 and a first driving rod 52. The first moveable unit 1 is slidably connected to the first driving rod 52. The first piezo actuator 51 is adapted to drive the first driving rod 52 to move the first moveable unit 1 relative to the first driving rod 52 in a first direction X.

With reference to FIGS. 2, 3A and 3B, in one embodiment, the second driving module 6 comprises a second piezo actuator 61 and a second driving rod 62. The second moveable unit 2 is slidably connected to the second driving rod 62. The second piezo actuator 61 is adapted to drive the second driving rod 62 to move the second moveable unit 2 relative to the second driving rod 62 in a second direction (−X). The first direction X is opposite the second direction (−X).

In one embodiment, the first driving rod 52 and the second driving rod 62 can be carbon rods or rods of other materials.

With reference to FIG. 4, in one embodiment, the first moveable unit 1 comprises a first moveable platform 11 and a first sheath member 12. The first sheath member 12 is connected to the first moveable platform 11. The first optical element is disposed on the first moveable platform 11. The first sheath member 12 is telescoped on the first driving rod 52.

Figure 5:
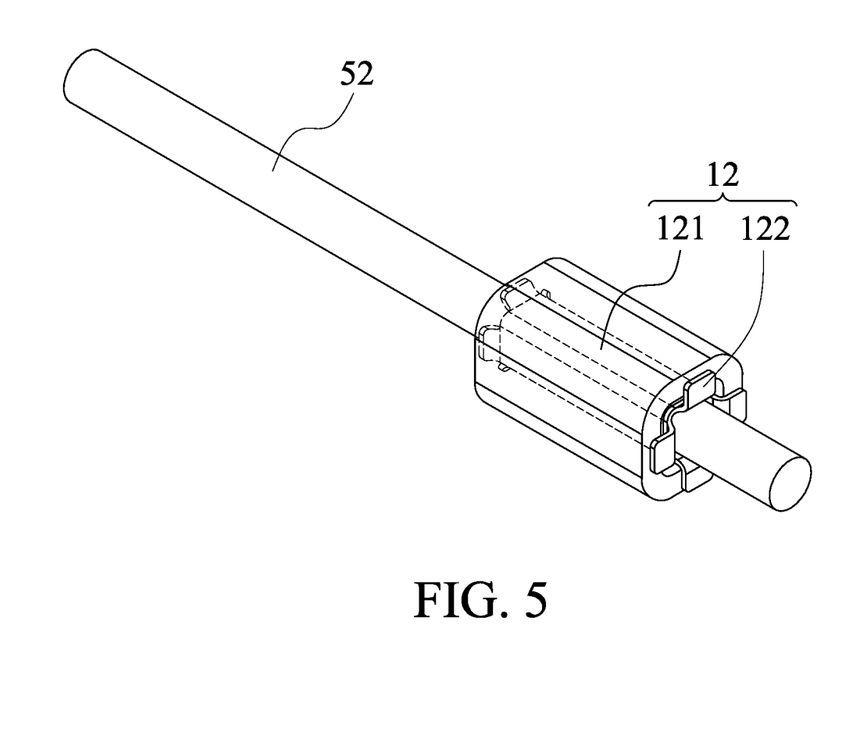
FIG. 5 shows the details of the first sheath member of the embodiment of the invention.

FIG. 5 shows the details of the first sheath member of the embodiment of the invention. With reference to FIG. 5, in one embodiment, the first sheath member 12 comprises an elastic sheath 121 and a plurality of holding elements 122. The holding elements 122 are sandwiched between the first driving rod 52 and the elastic sheath 121. Each holding element 122 linearly contacts the first driving rod 52, and the holding elements 122 can be easily slid relative to the first driving rod 52. In one embodiment, the cross-section of each holding element 122 is L-shaped, and the first driving rod 52 is a circular rod. The holding elements 122 can be made of metal.

With reference to FIG. 4, in one embodiment, the first moveable platform 11 comprises a first holding portion 111 and a second holding portion 112. The first sheath member 12 is held between the first holding portion 111 and the second holding portion 112.

With reference to FIGS. 3B and 4, in one embodiment, the first driving module 5 further comprises a first buffer member 53, the first buffer member 53 is telescoped on one end of the first driving rod 52, and the first buffer member 53 is affixed to the base 4.

With reference to FIGS. 3B and 4, in one embodiment, the base 4 comprises a hole 411 and the first buffer member 53 is affixed in the hole 411. In one embodiment, the first buffer member 53 is affixed in the hole 411 with glue. In one embodiment, the first buffer member 53 contacts the annular surface of the hole 411.

Figure 6:
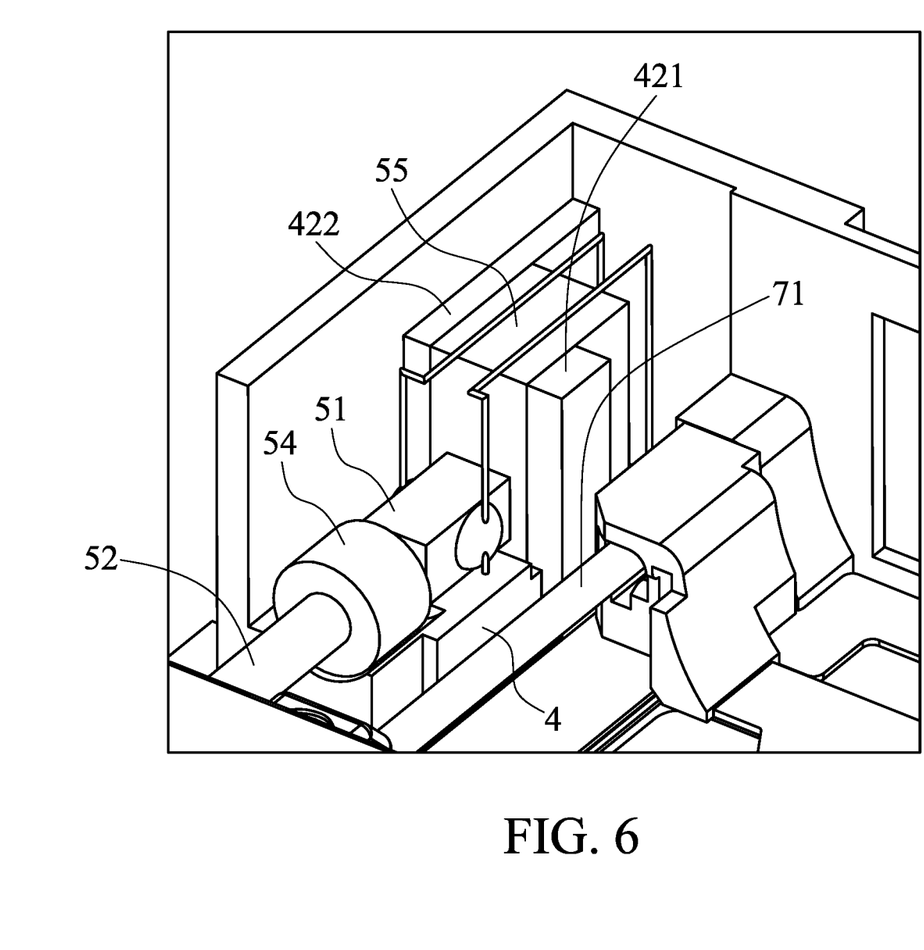
FIG. 6 shows a portion of the base of the embodiment of the invention.

FIG. 6 shows a portion of the base of the embodiment of the invention. With reference to FIGS. 3B, 4 and 6, in one embodiment, the first driving module 5 further comprises a second buffer member 54. The second buffer member 54 is telescoped on the first driving rod 52. The second buffer member 54 abuts the base 4. The first sheath member 12 is located between the first buffer member 53 and the second buffer member 54. In this embodiment, the second buffer member 54 partially abuts the base 4. In one embodiment, the second buffer member 54 is attached to the base 4 with elastic glue.

With reference to FIGS. 3B, 4 and 6, in one embodiment, the first piezo actuator 51 generates a vibration wave. The vibration wave travels between the first piezo actuator 51 and the first buffer member 53, and travels along the first driving rod 52. The vibration wave pushes the first sheath member 12 and the first moveable unit 1 is moved thereby. In this embodiment, the first buffer member 53 and the second buffer member 54 provide buffer effect to prevent the first driving rod 52 from being broken by unexpected impact.

With reference to FIGS. 3B and 6, in one embodiment, the first piezo actuator 51 abuts the base 4. One side in particular of the first piezo actuator 51 abuts the base 4. The disclosure is not meant to restrict the invention. In another embodiment, the first piezo actuator 51 is not directly connected to the base 4.

With reference to FIG. 6, in one embodiment, the first driving module 5 further comprises a counterweight block 55. The counterweight block 55 is affixed to the base 4, and the first piezo actuator 51 is connected to the counterweight block 55.

With reference to FIG. 6, in one embodiment, the base 4 comprises a first wall 421 and a second wall 422. The counterweight block 55 is sandwiched between the first wall 421 and the second wall 422. Three sides of the counterweight block 55 in particular abut the base 4. The counterweight block 55 improves the operation stability of the first piezo actuator 51 and the first driving rod 52.

With reference to FIGS. 2, 3A and 3B, in one embodiment, the lens module M further comprises a first guiding rod 71 and the second guiding rod 72. Two ends of the first guiding rod 71 are affixed to the base 4. Two ends of the second guiding rod 72 are affixed to the base 4. The first moveable unit 1 is slidably connected to the first guiding rod 71 and the second guiding rod 72. The second moveable unit 2 is slidably connected to the first guiding rod 71 and the second guiding rod 72. The first moveable unit 1 and the second moveable unit 2 are slidable along the first guiding rod 71 and the second guiding rod 72, and the size of the lens module is decreased.

With reference to FIGS. 2, 3A and 3B, in one embodiment, viewed from the Z-axis direction, the first guiding rod 71 and the second guiding rod 72 are located between the first driving rod 52 and the second driving rod 62. The first moveable platform 11 is located between the first driving rod 52 and the second driving rod 62. The first guiding rod 71 is adjacent to the first driving rod 52. The second guiding rod 72 is adjacent to the second driving rod 62.

Figure 7:
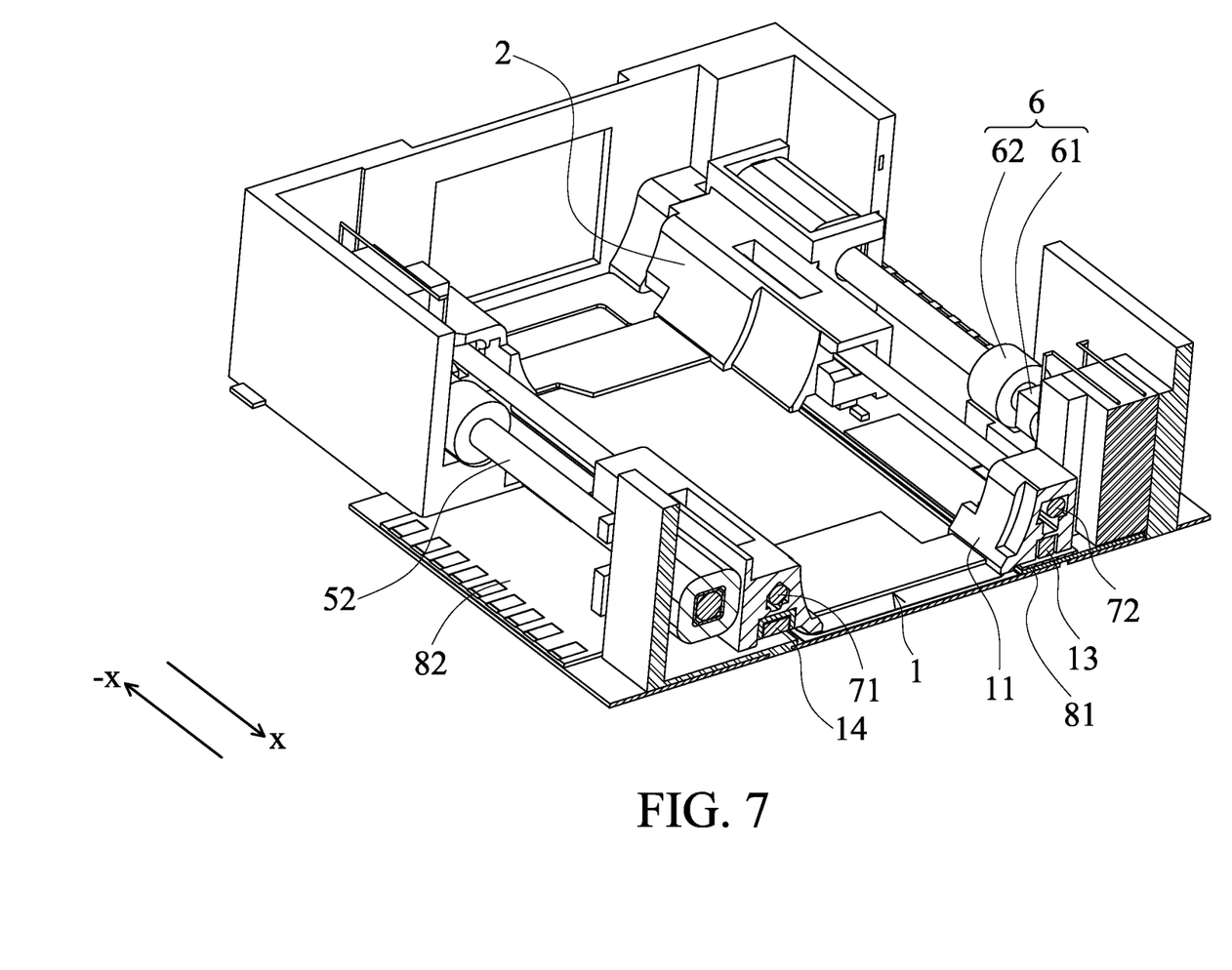
FIG. 7 is a cross sectional view of a portion of the lens module.

FIG. 7 is a cross sectional view of a portion of the lens module. With reference to FIGS. 2 and 7, in one embodiment, the lens module further comprises a magnetic restriction element 81. The magnetic restriction element 81 is disposed on the base 4. The first moveable unit 1 comprises a unit magnetic element 13. The unit magnetic element 13 is disposed on the first moveable platform 11. Magnetic attraction is formed between the magnetic restriction element 81 and the unit magnetic element 13. The first moveable unit 1 thus sufficiently contacts the first guiding rod 71 and the second guiding rod 72. The first moveable unit 1 is prevented from misalignment and excessive vibration in unexpected strike.

With reference to FIGS. 2 and 7, in one embodiment, the lens module further comprises a circuit board 82. The circuit board 82 comprises a sensor 821. The first moveable unit 1 further comprises an induction magnet 14. The induction magnet 14 is disposed on the first moveable platform 11. The sensor 821 is corresponding to the induction magnet 14. In one embodiment, the induction magnet 14 is a Hall magnet. The sensor 821 is a Hall sensor. The position of the first moveable unit 1 can be detected via the sensor 821 and the induction magnet 14. The circuit board 82 is below the first moveable unit 1.

With reference to FIGS. 2 and 7, in one embodiment, the circuit board 82 can be a flexible circuit board. The base 4 can further comprises an enhancement sheet, and the enhancement sheet supports the circuit board 82.

With reference to FIG. 7, in one embodiment, the unit magnetic element 13 and the magnetic restriction element 81 correspond to the second guiding rod 72, and the sensor 81 and the induction magnet 14 correspond to the first guiding rod 71.

With reference to FIGS. 3A, 4 and 7, in one embodiment, the first moveable platform 11 comprises a first platform body 113, a second platform body 114 and a supporting sheet 115. The supporting sheet 115 is disposed between the first platform body 113 and the second platform body 114, and the supporting sheet 115 is also located between the first optical element 31 and the circuit board 82. The supporting sheet 115 has reduced thickness and increased strength. Utilizing the supporting sheet 115, the size of the lens module can be further decreased.

The details of the first moveable unit and the first driving module of the embodiment of the invention are descripted above. In the embodiment of the invention, the details of the second moveable unit and the second driving module are similar to that of the first moveable unit and the first driving module, and the related description is thus omitted. The disclosure is not meant to restrict the invention.

In the lens module of the embodiment of the invention, the optical elements are moved by the piezo actuators. The lens module thus can be easily integrated into the smartphone. The first buffer member and the second buffer member are utilized in the lens module to provide buffer effect to prevent the lens module from being damaged in unexpected strike, and the reliability of the lens module is improved. Additionally, the unit magnetic element and the magnetic restriction element are utilized, and the first moveable unit can sufficiently contact the first guiding rod and the second guiding rod. The first moveable unit is prevented from misalignment and excessive vibration.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens module, comprising:
   a first optical element;
   a first moveable unit, wherein the first optical element is disposed on the first moveable unit;
   a base; and
   a first driving module, disposed on the base, wherein the first driving module is connected to the first moveable unit, and is adapted to move the first moveable unit relative to the base,
   wherein the first driving module comprises a first piezo actuator and a first driving rod, the first moveable unit is slidably connected to the first driving rod, and the first piezo actuator is adapted to drive the first driving rod to move the first moveable unit relative to the first driving rod in a first direction, and
   wherein the first moveable unit comprises a first moveable platform and a first sheath member, the first sheath member is connected to the first moveable platform, the first optical element is disposed on the first moveable platform, and the first sheath member encircles the first driving rod.

2. The lens module as claimed in claim 1, further comprising:
   a second optical element, corresponding to the first optical element;
   a second moveable unit, wherein the second optical element is disposed on the second moveable unit; and
   a second driving module, disposed on the base, wherein the second driving module is connected to the second moveable unit, and is adapted to move the second moveable unit relative to the base.

3. The lens module as claimed in claim 2, wherein the second driving module comprises a second piezo actuator and a second driving rod, the second moveable unit is slidably connected to the second driving rod, and the second piezo actuator is adapted to drive the second driving rod to move the second moveable unit relative to the second driving rod in a second direction, and the first direction is opposite the second direction.

4. The lens module as claimed in claim 3, wherein the first sheath member comprises an elastic sheath and a plurality of holding elements, the holding elements are sandwiched between the first driving rod and the elastic sheath, and each holding element linearly contacts the first driving rod.

5. The lens module as claimed in claim 3, wherein the first moveable platform comprises a first holding portion and a second holding portion, and the first sheath member is held between the first holding portion and the second holding portion.

6. The lens module as claimed in claim 3, wherein the first driving module further comprises a first buffer member, the first buffer member is telescoped on one end of the first driving rod, and the first buffer member is affixed to the base.

7. The lens module as claimed in claim 6, wherein the base comprises a hole and the first buffer member is affixed in the hole.

8. The lens module as claimed in claim 7, wherein the first buffer member is affixed in the hole by glue.

9. The lens module as claimed in claim 6, wherein the first driving module further comprises a second buffer member, the second buffer member is telescoped on the first driving rod, the second buffer member abuts the base, and the first sheath member is located between the first buffer member and the second buffer member.

10. The lens module as claimed in claim 9, wherein the first piezo actuator abuts the base.

11. The lens module as claimed in claim 10, wherein the first driving module further comprises a counterweight block, the counterweight block is affixed to the base, and the first piezo actuator is connected to the counterweight block.

12. The lens module as claimed in claim 10, wherein the base comprises a first wall and a second wall, the counterweight block is sandwiched between the first wall and the second wall.

13. The lens module as claimed in claim 3, further comprising a first guiding rod and the second guiding rod, two ends of the first guiding rod are affixed to the base, two ends of the second guiding rod are affixed to the base, the first moveable unit is slidably connected to the first guiding rod and the second guiding rod, the second moveable unit is slidably connected to the first guiding rod and the second guiding rod, and the first moveable unit and the second moveable unit are slidable along the first guiding rod and the second guiding rod.

14. The lens module as claimed in claim 13, further comprising a magnetic restriction element, wherein the magnetic restriction element is disposed on the base, the first moveable unit comprises a unit magnetic element, the unit magnetic element is disposed on the first moveable platform, and magnetic attraction is formed between the magnetic restriction element and the unit magnetic element.

15. The lens module as claimed in claim 13, further comprising a circuit board, wherein the circuit board comprises a sensor, the first moveable unit further comprises an induction magnet, the induction magnet is disposed on the first moveable platform, and the sensor is corresponding to the induction magnet.

16. The lens module as claimed in claim 15, wherein the unit magnetic element and the magnetic restriction element correspond to the second guiding rod, and the sensor and the induction magnet correspond to the first guiding rod.

17. The lens module as claimed in claim 15, wherein the first moveable platform comprises a supporting sheet, and the supporting sheet is located between the first optical element and the circuit board.

18. The lens module as claimed in claim 13, wherein the first guiding rod and the second guiding rod are located between the first driving rod and the second driving rod.

* * * * *